T. REDFERN.
CARBURETER CONTROL MEANS FOR GAS ENGINES.
APPLICATION FILED JULY 3, 1920.
1,399,519.
Patented Dec. 6, 1921.
3 SHEETS—SHEET 1.
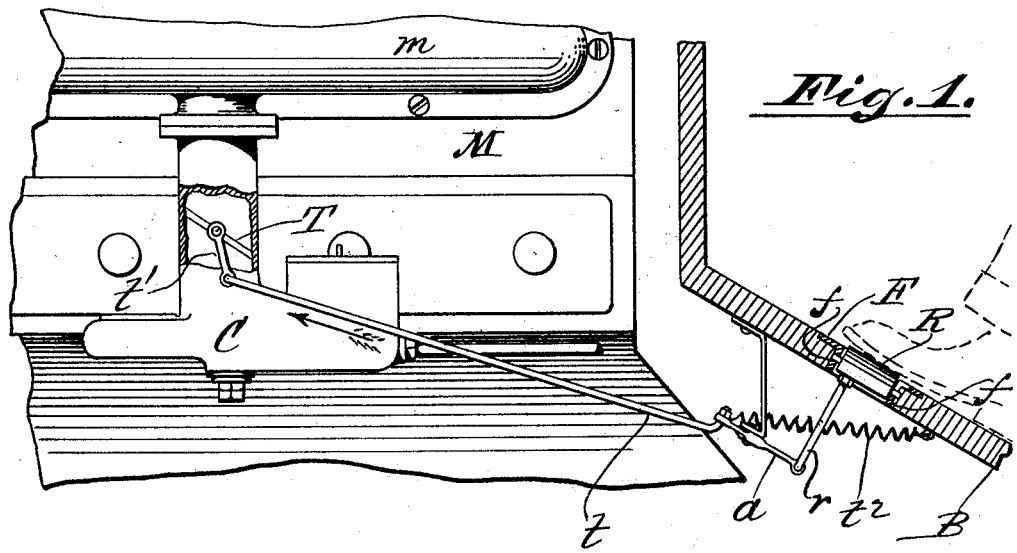
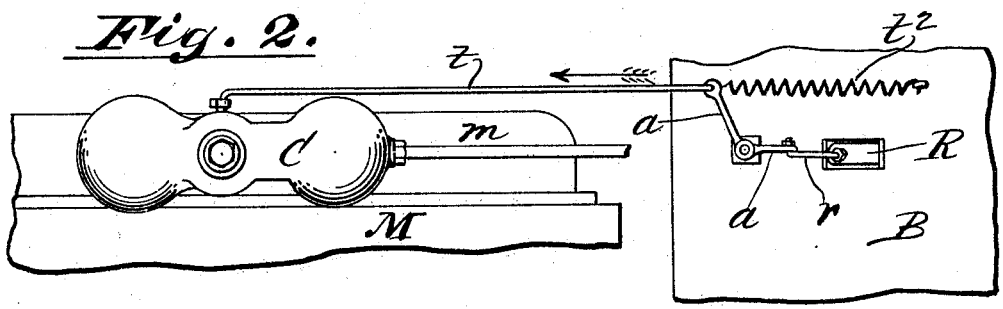
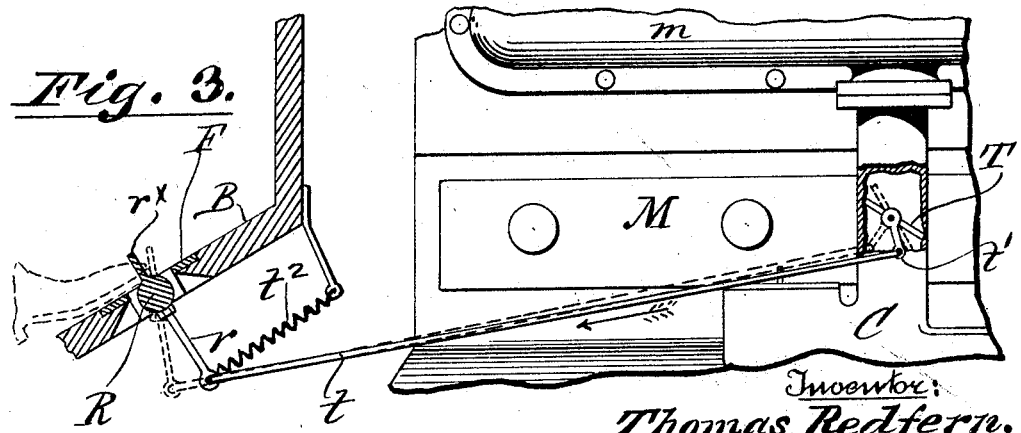
Inventor:
Thomas Redfern,
By his Attorney,
Geo. Wm Miatt

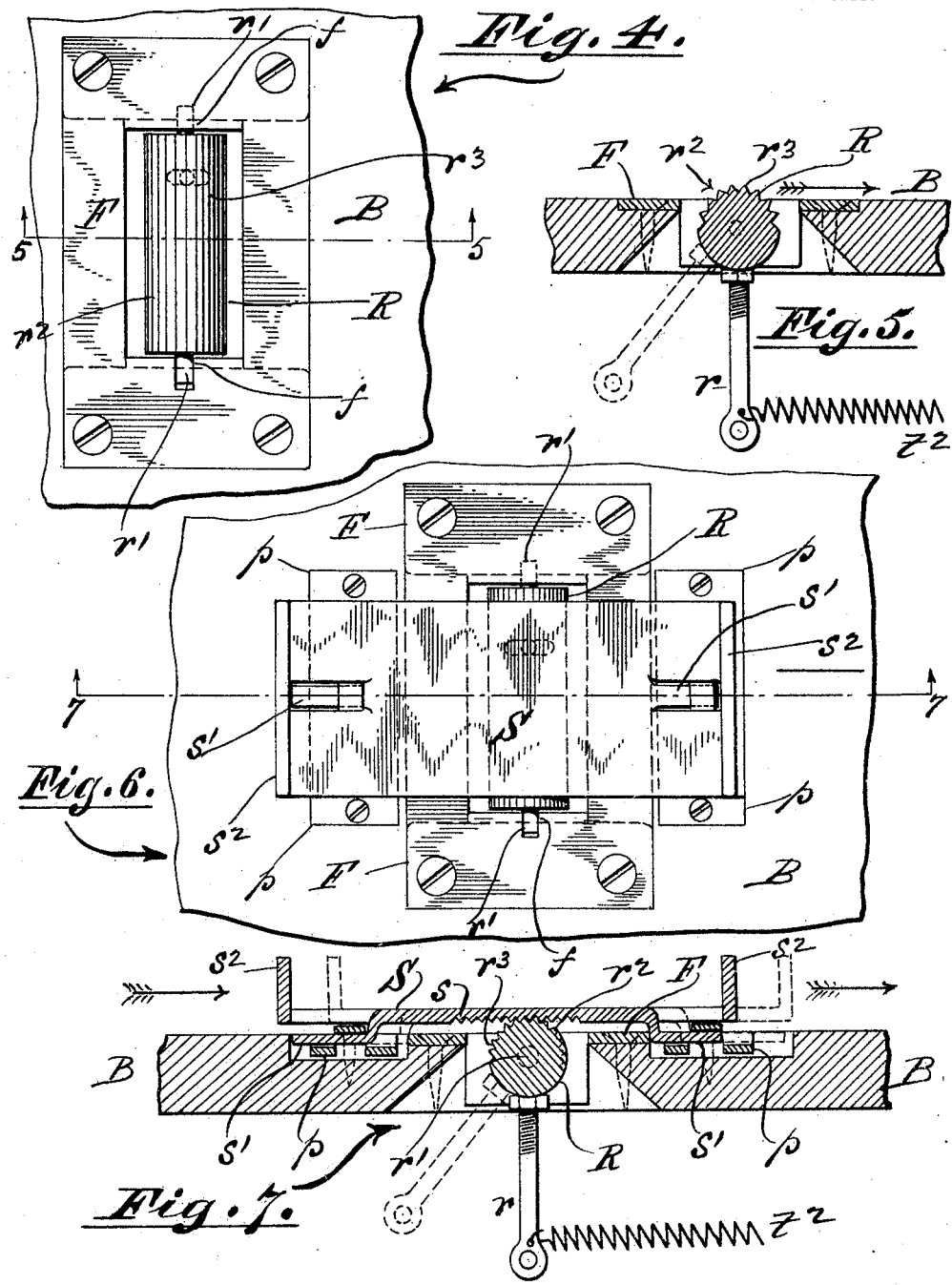

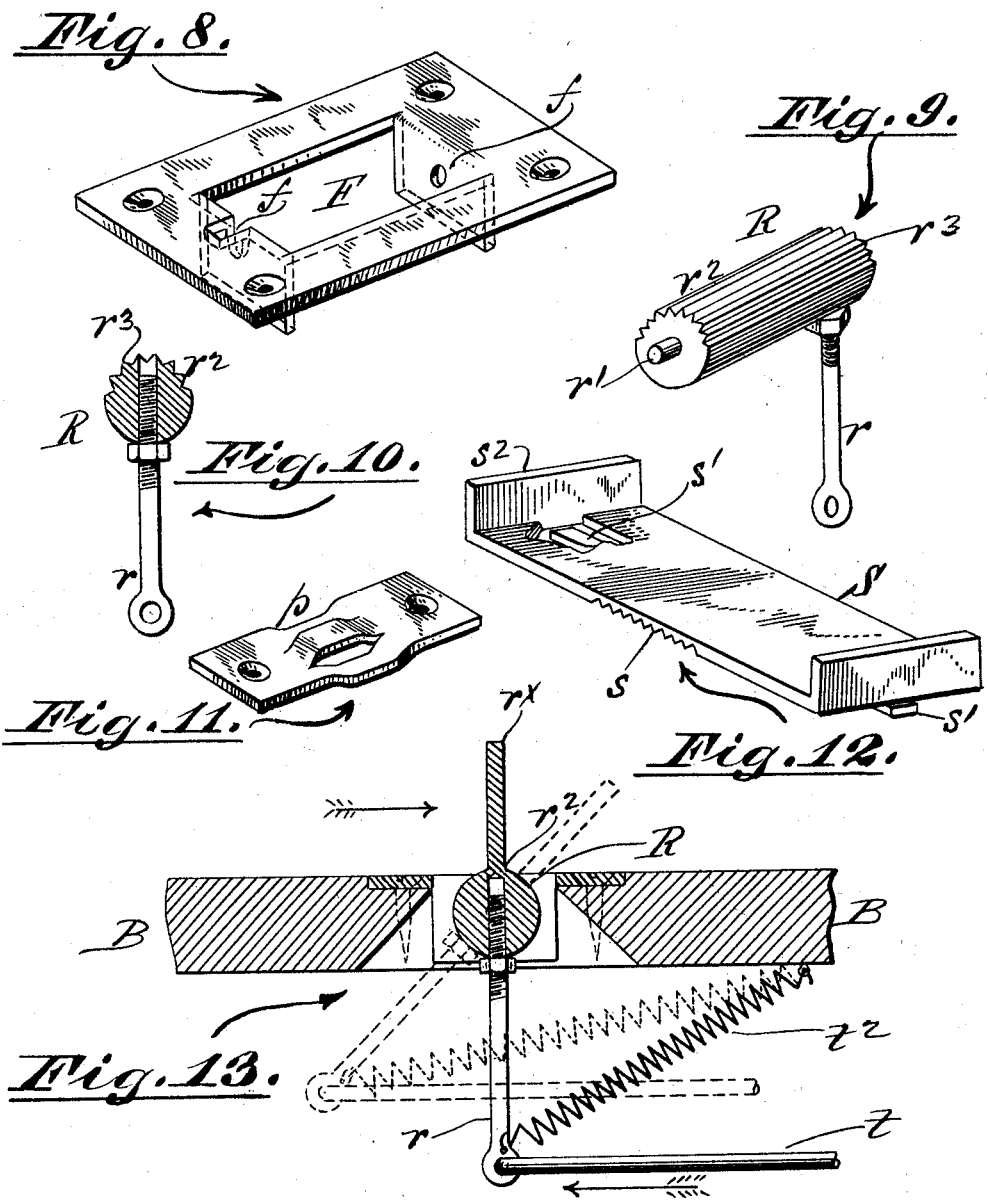

UNITED STATES PATENT OFFICE.

THOMAS REDFERN, OF KEARNEY, NEW JERSEY.

CARBURETER-CONTROL MEANS FOR GAS-ENGINES.

1,399,519.   Specification of Letters Patent.   Patented Dec. 6, 1921.

Application filed July 3, 1920. Serial No. 393,944.

*To all whom it may concern:*

Be it known that I, THOMAS REDFERN, a citizen of the United States, and a resident of Kearney, county of Hudson, and State of New Jersey, have invented certain new and useful Improvements in Carbureter-Control Means for Gas-Engines, of which the following is a specification.

My invention relates to means for effecting control of the throttle valve of a gas engine, and the principle involved is applicable to all motors of this type in the practical use of which foot control is a desideratum, whether the motor be stationary and used in the direct operation of a working part or implement, such for example as for running a saw or analogous operative part intermittently or at variable speed, or for use in propelling a vehicle, either land or marine, such for instance as an automobile or motor boat.

While thus applicable in a general way to gas motors in the abstract my improvements are designed primarily and specially for use in conjunction with the gasoline motors of automobiles, the object being to facilitate the comfort and convenience of the operator, and at the same time to render the control more sensitive and effective, and susceptible of accurate adjustment of throttle area in accordance with the constantly varying requirements and exigencies of traffic. Heretofore, so far as I am aware of the state of the art, the carbureter throttle valve has been controlled by a depressible foot pedal acting in conjunction with, and against the resistance of, a retractile spring which tended constantly to close said throttle valve, so that the operator has to maintain a constant downward pressure on the pedal in order to hold said throttle valve open, the degree of pressure required for the purpose being in proportion to the extent of valve opening required, and necessitating the holding of the foot continuously in one position. This constant fixed position and variable downward pressure exerted upon the control treadle by the foot of the operator is exacting and fatiguing to both the muscles and nerves of the operator, and the main cause of discomfort and inconvenience in running a car under conditions heretofore and at present in vogue, especially where traffic is congested, necessitating frequent variations in speed, or on long runs at high speed when a maximum of pressure has to be exerted to keep the throttle wide open, or substantially so.

The main object of my invention is to obviate these objections to throttle control; to attain accuracy thereof; to relieve the operator of strain and nerve tension; and to render the control more positive and effective than heretofore. Another object is to render the foot control better adapted to the requirements, convenience, and comfort of female operators, while equally advantageous for male use. Still another object is to provide for the adjustment of the stroke of the thrust rod connected with and actuating the throttle valve; all as hereinafter fully set forth, the invention consisting in the specific construction and arrangement of parts and appurtenances described and claimed, and a distinctive feature being the substitution of transverse sliding foot motion in the valve control in lieu of the vertical or downward treadle motion and pressure heretofore requisite.

In the accompanying drawings,

Figure 1, is an elevation of parts of a motor and throttle control illustrating a practical embodiment of my invention;

Fig. 2, is a view of the under side of the parts shown in Fig. 1;

Fig. 3, is a view similar to Fig. 1, showing a modification;

Fig. 4, is a top view of the throttle control rock lever and fulcrum plate;

Fig. 5, is a section taken upon plane of line 5—5, Fig. 4;

Fig. 6, is a plan of the rock lever and fulcrum plate with a foot rest slide plate superposed thereon;

Fig. 7, is a section taken upon plane of line 7—7, Fig. 6;

Fig. 8, is a perspective view of the rock lever fulcrum plate;

Fig. 9, is a perspective view of the throttle control rock lever;

Fig. 10, is a transverse section of the rock lever showing means for adjusting the stroke of the thrust arm and throttle connecting rod;

Fig. 11, is a perspective view of one of the foot rest slide bearing plates;

Fig. 12, is a perspective view of the foot rest slide plate;

Fig. 13, is a sectional view illustrating a modification in the construction and operation of the throttle control rock lever.

M, represents the portion of a gas motor adjacent to the carbureter C, and T, a throttle valve interposed between said carbureter C, and the manifold m, of the motor M, these parts being of usual and well known construction.

t, is the throttle-actuating connection rod pivotally attached to the valve crank arm $t'$, and either directly or indirectly to the thrust arm r, of the rock lever R. The latter is formed with trunnions $r'$, $r'$, seated in bearings f, f, in the fulcrum plate F, which is countersunk in the foot board B.

The thrust arm r, of the rock lever R, is of course the lower member thereof as related to its trunnions $r'$, $r'$. The upper portion or protuberance $r^2$, above the trunnions $r'$, $r'$, may be constructed in various ways to afford means whereby the said lever R, may be rocked by foot on its said trunnions $r'$, $r'$. This protuberant upper portion $r^2$, of the rock lever R, is in reality the actuating arm thereof, and may be formed for contactual engagement with rocking means by the provision of a series of essentially concentric teeth $r^3$, as in Figs. 1, 2, 4, 5, 6, 7, 9 and 10, or with a single contact arm or extension $r^x$, as in Figs. 3 and 13, the concentric teeth $r^3$, and the contact arm $r^x$, being essentially equivalent mechanical expedients in that both function alike, the single contact arm $r^x$, being substantially a modification and extension of one of the series of teeth $r^3$.

Where the eccentric teeth $r^3$, are used for the purpose they are made to extend slightly above the surface of the fulcrum plate F, so as to afford a bearing for the sole of the foot, as indicated in Fig. 1; or a slidable foot rest S, may be provided, as in Figs. 6, 7, 11 and 12, the under side of which is formed with a series of rack teeth s, s, for engagement with the aforesaid eccentric teeth $r^3$, on the rock lever R, in either of which cases a movement of the sole of the foot transversely as related to the pivotal axis of the lever R, may be made to rock the latter on its trunnions $r'$, $r'$, against the resistance of the usual retractile spring $t^2$, which tends constantly, as heretofore, to close the throttle. By preference, the parts are so arranged that a movement of the sole of the foot laterally toward the right will effect the opening of the throttle, (although this is not an essential point) because the right foot is usually employed for the purpose and the movement thereof from left to right is the most natural under the circumstances, the foot being turned outward on the heel as pivotal center.

When the foot rest S, is provided as above stated it is slidably mounted to straddle the rock lever R, and its fulcrum plate F, in any manner that may be found most expedient. In the drawings it is shown as formed with tongues $s'$, $s'$, on its under side which engage with strap bearing plates p, p, secured to the foot board B, on either side of the fulcrum plate F, as will be seen by reference more particularly to Fig. 7; and it is also formed with end shoulders $s^2$, $s^2$, constituting lateral bearings.

The slidable foot rest S, is designed more particularly for the comfort and convenience of feminine operators, obviating the necessity for direct contact with the concentric teeth $r^3$, of the rock lever, although equally advantageous for the use of masculine drivers.

In all the figures of the drawings except Fig. 3, the rock lever R, is shown as mounted and arranged to rock laterally as related to the throttle connection rod t, and a bell crank lever a, (Figs. 1 and 2) is interposed between and pivotally connected with said throttle rod t, and the outer end of the thrust arm r, of the rock lever R, so as to compensate for difference in alinement. In Fig. 3, a modification is shown in which the rock lever R, is fulcrumed axially at right angles to said throttle rod t, in which case the thrust arm r, of the rock lever R, is pivotally connected directly with the throttle rod t, and the foot of the operator is moved longitudinally instead of laterally to operate the valve T, the result being the same in either arrangement in that a rock lever is substituted in lieu of the treadle heretofore employed for the purpose of effecting throttle control.

The advantages of flat sliding foot control in lieu of vertical downward treadle pressure are obvious, such as greater convenience and ease of operation, perfect and full foot support, freedom of foot motion, etc., it not being necessary to hold the foot rigidly in a prescribed position, nor to press down hard therewith, only frictional resistance sufficient to counteract the pull of the retractile spring being required in order to hold the valve open. Hence the muscles of the foot and leg are not strained, thus obviating physical and nerve fatigue, and reducing requisite exertion to a minimum degree.

An incidental but important feature of my invention consists in providing for the adjustment of the length of the thrust arm r, of the rock lever R, so as to regulate the throttle action, and this I accomplish as shown more particularly in Fig. 10, by female-threading the hub of the rock lever, male threading the inner extremity of the said thrust arm r, and providing it with a lock or jam nut $r^x$.

What I claim as my invention and desire to secure by Letters Patent is,

1. In combination with a gas motor of the character designated, a throttle valve controlling means comprising a rock lever pivotally mounted and provided on one side of its fulcrum with a rigid thrust arm connected with a valve-actuating rod and formed with rockable means on the other side of its fulcrum adapting it to be rocked laterally in one direction as related to the throttle valve connecting means by foot pressure to open the valve, a bell crank lever interposed between said thrust arm and its connection with the throttle rod, and a retractile spring acting in opposition to said pressure and tending to constantly rock the lever in the opposite direction to close the valve.

2. In combination with a gas motor of the character designated, throttle valve controlling means comprising a rock lever pivotally connected on one side of its fulcrum with the valve-actuating rod, and formed on the other side of its fulcrum with concentric rack teeth, a foot rest slide formed with rack teeth engaging with said concentric rack teeth on the rock lever, whereby the lever may be rocked in one direction to open the valve against the resistance of a retractile spring, and said retractile spring arranged to tend constantly to rock the lever in the opposite direction to close the valve.

THOMAS REDFERN.

Witnesses:
GEO. WM. MIATT,
DOROTHY MIATT.